United States Patent [19]

Liu et al.

[11] Patent Number: 4,931,327

[45] Date of Patent: Jun. 5, 1990

[54] WHITE OPAQUE OPP FILM FOR TAMPER EVIDENT PACKAGE

[75] Inventors: Leland L. Liu, Olm, Luxembourg; Michael T. Heffelfinger, Fairport; Donald G. Whyman, Victor, both of N.Y.

[73] Assignee: Mobil Oil Corporation, New York, N.Y.

[21] Appl. No.: 366,094

[22] Filed: Jun. 14, 1989

[51] Int. Cl.$^5$ .................. B32B 3/26; B32B 7/00; B65D 65/38

[52] U.S. Cl. ..................... 428/36.5; 206/807; 383/5; 428/34.1; 428/35.7; 428/36.4; 428/212; 428/213; 428/315.5; 428/315.7; 428/316.6; 428/317.9; 428/349; 428/407; 428/516

[58] Field of Search ............ 428/315.5, 315.7, 315.9, 428/316.6, 317.9, 349, 407, 516, 319.1, 34.1, 36.5, 35.7, 36.4, 212, 213; 206/807; 383/5

[56] References Cited

U.S. PATENT DOCUMENTS

| | | | |
|---|---|---|---|
| 4,121,003 | 10/1978 | Williams | 428/203 |
| 4,377,616 | 3/1983 | Ashcraft et al. | 428/427 |
| 4,429,015 | 1/1984 | Sheptalk | 428/212 |
| 4,488,646 | 12/1984 | McCorkle | 428/34.3 |
| 4,509,196 | 4/1985 | Sah et al. | 383/5 |
| 4,510,621 | 4/1985 | Sak et al. | 206/807 |
| 4,557,505 | 12/1985 | Schaefer et al. | 428/40 |
| 4,582,736 | 4/1986 | Duncan | 428/315.5 |
| 4,632,869 | 12/1986 | Park et al. | 428/317.9 |
| 4,652,473 | 3/1987 | Han | 428/40 |
| 4,701,370 | 10/1987 | Park | 428/316.6 |
| 4,702,954 | 10/1987 | Duncan | 428/317.9 |
| 4,709,396 | 1/1987 | Voshall et al. | 383/5 |
| 4,760,919 | 8/1988 | Pereyra | 206/807 |
| 4,876,123 | 10/1989 | Rivera et al. | 206/807 |

FOREIGN PATENT DOCUMENTS 0148030 7/1985 European Pat. Off. .............. 383/5

Primary Examiner—Ellis P. Robinson
Assistant Examiner—Archene A. Turner
Attorney, Agent, or Firm—Alexander J. McKillop; Charles J. Speciale; James P. O'Sullivan, Sr.

[57] ABSTRACT

A tamper-evident film includes a hydrocarbon polymer core layer (a) having an upper face and a lower face; an oriented tamper-evident layer applied to at least the lower face of core layer (a), layer (b) being fabricated from a mixture of a polyolefin and a filler of particles which induce cavitation upon orientation, layer (b) having an internal cohesiveness which is less than the internal cohesiveness and bonding strength of packaging adhesives and heat seals; and, an oriented skin layer (c) applied to the upper face of core layer (a) if layer (b) has not been applied thereon, layer (c) being hydrocarbon polymer. A tamper-evident package seal and package are also provided.

21 Claims, 2 Drawing Sheets

WHITE OPAQUE OPP FILM FOR TAMPER EVIDENT PACKAGE

BACKGROUND OF THE INVENTION

This invention relates to tamper-evident multilayer plastic packaging films and to a tamper-evident package seal made therefrom using an adhesive cold seal.

In the past, in the packaging of certain types of food, for example, candy bars, which require packaging sealed with a cold adhesive, a sealed package is capable of being opened and subsequently put back together without evidence of tampering. The present invention remedies this problem. A tamper-evident packaging film and seal such as that of the present invention can not be resealed once the seal has been opened.

U.S. Pat. No. 4,429,015 to Sheptak discloses a multiply laminate for identification cards. Attempts to delaminate the card results in fibers being torn from a uniaxially oriented polyethylene or polypropylene layer of the laminate.

U.S. Pat. No. 4,121,003 to Williams discloses switch-proof labels using a laminate having a pattern printed on the label inner surface and a coating of pressure sensitive adhesive film on the inner surface. Attempts to transfer the label result in disruption of the printed pattern.

Neither the Williams nor Sheptak laminate is suitable for food packaging.

U.S. Pat. No. 4,632,869, the contents of which are incorporated by reference herein, discloses an opaque, biaxially oriented polymeric film structure with a thermoplastic polymer matrix core layer possessing a stratum of voids a substantial number of which contain at least one spherical void-initiating solid particle of polybutylene terephthalate, and a void-free thermoplastic skin layer on at least one surface thereof.

U.S. Pat. No. 4,377,616, the contents of which are incorporated by reference herein, discloses a lustrous, opaque biaxially oriented polymer laminate film structure comprising a thermoplastic polymer matrix core layer possessing numerous voids, a substantial number of which contain at least one void-initiating article, and transparent skin layers adhering to the surfaces of the core layer. The skin layers are of a thickness to cover surface irregularities inherent in a cavitated core layer. The structure of the core layer imparts a much higher degree of opacity than that imparted by the use of opacifying pigment alone, due to the effects of light scattering.

These opaque biaxially oriented polymer laminate structures have been used to provide films with low water vapor and gas transmission rate and pleasing appearance.

A plastic film having all these desirable characteristics and also having a tamper-evident property is much desired.

It is an object of the present invention to provide a tamper-evident packaging seal utilizing a film structure which provides a tamper-evident property to a package seal.

This tamper-evident packaging film can be sealed with heat or cold seals. Opening of the seal will result in irreversible tearing of the film so that the package can not be resealed without evidence of tampering.

SUMMARY OF THE INVENTION

A tamper-evident film is provided which consists of three layers: a core layer (a) and two layers (b) and (c) on the lower and upper surfaces of layer (a) respectively. The core layer (a) can be fabricated from a polymer material of clear polypropylene, polyethylene or ethylene copolymerized with alpha olefins or blends thereof. The core layer (a) optionally may be an opaque layer which has a stratum of voids therein which may provide other desirable film properties. The skin layer (b) is fabricated from a mixture of a polyolefin and a filler which induces cavitation upon orientation. Skin layer (c) can be either identical or different from the layer (b). If different from layer (b), layer (c) can be fabricated from a member of the group consisting of hydrocarbon homopolymers, copolymers or blends thereof.

The tamper-evident film may be used to provide a tamper-evident packaging seal which includes at least one tamper-evident film. In forming a package seal, the tamper-evident film may be bound to either an identical or a different film with an adhesive, heat sealant, or heat seal. The adhesive, heat sealant, or heat seals have a seal internal cohesion and an affinity for bonded surfaces greater than the internal cohesive force of the tamper-evident film so that if a force is applied to separate the films, rupture is initiated by the cavitated skin, and tamper evidence occurs.

As a result of the present invention, a tamper-evident packaging seal is provided utilizing a tamper-evident packaging film with excellent barrier properties, a pleasing appearance, and a unique tamper-evident property which adds substantially to the security of the product packaged within it.

For a better understanding of the present invention, together with other and further objects, reference is made to the following description, and its scope will be pointed out in the appended claims.

DETAILED DESCRIPTION OF THE INVENTION

Figure 1:
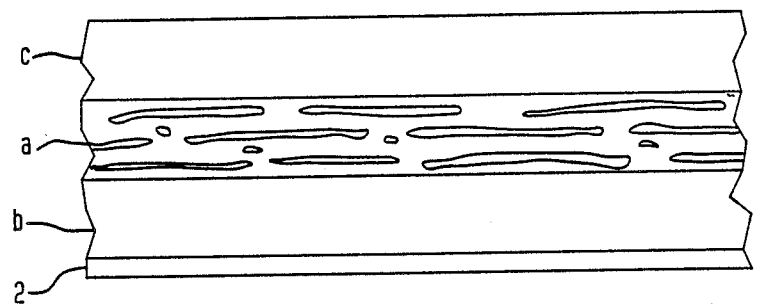
FIG. 1 is a schematic cross section of the tamper-evident film of the present invention.

According to FIG. 1, there can be seen a tamper-evident packaging film which can be prepared in accordance with the present invention such that a tamper-evident seal can be provided which is effective against undetected opening of the seal and which can be produced on a mass production scale and converted for end use quite readily for use, for example, in food packaging and other consumer products. In particular, FIG. 1 shows in cross section a three-layer extruded film which includes core layer (a), and skin layers (b) and (c). Furthermore, an adhesive material 2 has been shown on skin layer (b), which in one preferred embodiment, is a cold seal adhesive which can be used to package food products which will suffer in the presence of heat required to bond a heat seal packaging film.

In order to provide the present invention, the overall structure of the film shown in FIG. 1 is provided with a weakened layer (b) such that upon exertion of a force in a direction which tends to rupture the seal, the integrity of the weakened layer will be disrupted.

Figure 2:
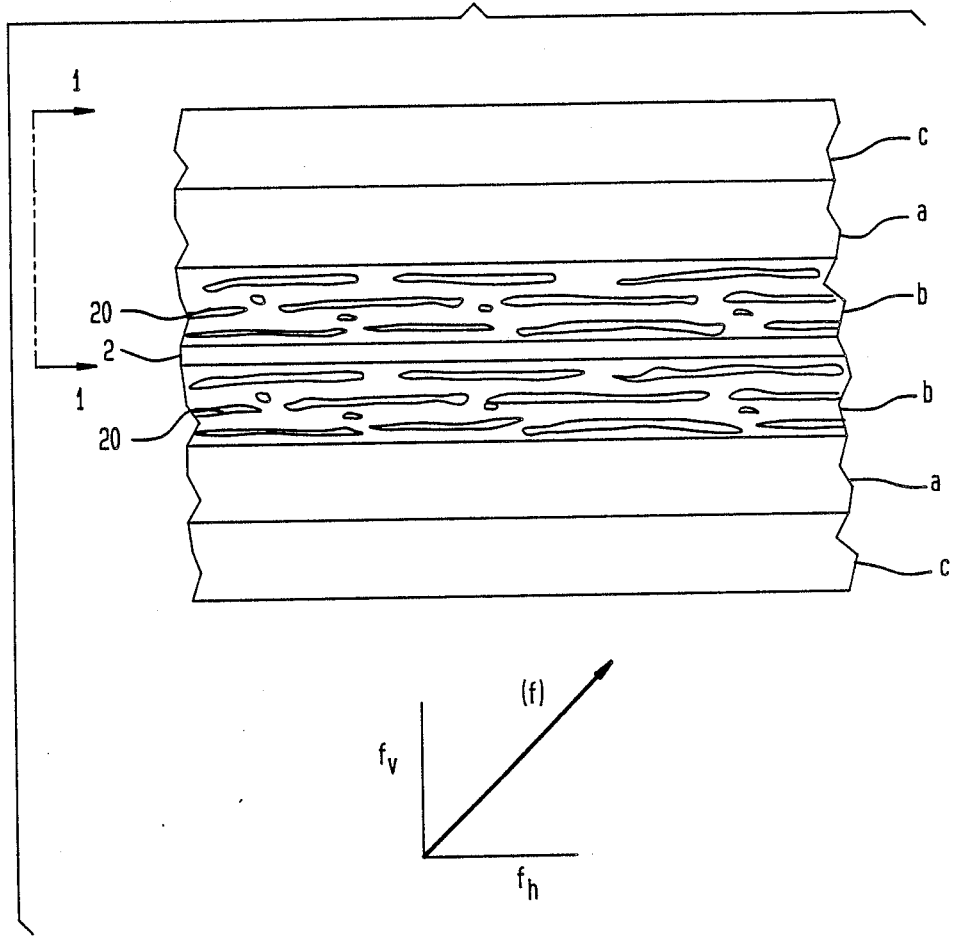
FIG. 2 is also a schematic cross section of a composite of a tamper-evident package seal in accordance with the invention.

Referring to FIG. 2, the structure of the present tamper-evident seal is shown schematically with 2 films of the present invention sealed together, layer (b) to layer (b). A force (f) is represented in vector format to show how a force might conceivably be applied to the structure. In particular, the composite tamper-evident seal is shown with the film being adhered to itself in an assembly such as that shown in FIG. 3. In such an assembly, the film will be joined together by the adhesive 2 which will, upon contact with itself, form a continuum between the outer layers (b) of the tamper-evident film. Accordingly, the adhesive layer 2 is shown as a single continuum in FIG. 2.

Figure 3:
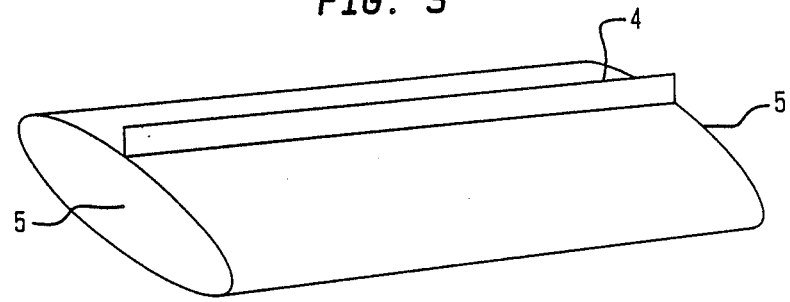
FIG. 3 is a schematic representation of a package formed from a single sheet of tamper-evident film prepared in accordance with the present invention.

FIG. 3 illustrates a package according to the present invention. The package may be formed from a single sheet of the film of the present invention with layer (b) on the inner surface. The film may be joined to itself with a fin seal 4. The sides of the package 5 may be sealed with a crimp and a cold seal adhesive (not shown). Depending on the product to be packaged, seals at 4 and 5 may also be heat seals. If the package is opened in the areas of the seals, the packaging film will delaminate so that the package cannot be resealed without evidence of tampering.

In accordance with the present invention, the strength of the adhesive layer 2 as well as the adhesive to surface adhesion strength between the adhesive layer 2 and the surface of film layer (b) is stronger than the internal cohesive force of layer (b). Thus, when a separating force (f) is applied to the tamper-evident seal, the integrity of the composite tamper-evident seal is destroyed by separation of layer (b). As a result of destruction in this manner, the seal is incapable of being resealed thus showing evidence of tampering.

For the packaging film used in the tamper-evident seal, the various materials are selected so that they possess interacting relative affinities (adhesion and/or cohesion). Relative affinities to be considered are the internal cohesion of the bonded polymer films and both the internal cohesion of the adhesive, heat sealant or heat seal and their affinities for the film surfaces which are bonded together, at least one of which film surfaces is comprised of layer (b). The cohesive strength of the adhesive, heat sealant or heat seal is greater than the internal cohesion of the layer (b). In addition, the adhesive, heat sealant, or heat seal possess an affinity for the surface of film layer (b) which is greater than the internal cohesive force of layer (b), so that when two film surfaces are sealed together and an attempt is made to separate the two surfaces, the adhesive layer, heat sealant or heat seal remains internally cohesive and adherent to the layer (b) surface and layer (b) will tear while the adhesive remains in place. Ideally, part or all of the skin layer (b) remains adherent to the adhesive or heat sealant.

The presence of layer (b) on the adjacent inside surfaces of two adhesively adhered opposing films which comprise a package seal prevents the package from being readily and undetectably resealed after being opened.

In packaging technology, a packaging film can be sealed with a coating that seals to itself. These coatings are called cold-seal coatings and are usually modified rubber-based material. Cohesives of this type are often used to package products which would be damaged by heat such as ice cream, candy bars, and confections.

When a cold seal adhesive is used to seal a packaging film, the two film surfaces which are to be sealed together are each coated with the cohesive and the coated surfaces are pressed together, adhesive to adhesive. Alternatively, two packaging film surfaces may be sealed together by applying an adhesive coating on one side and the surfaces are then pressed together, adhesive coated film to uncoated film.

In both of these methods, when using packaging films of the prior art, the seals can be separated with the packaging film intact, either by pulling apart two cold seal coated film surfaces, or by separating an adhesive coated film surface from an uncoated film surface.

In the present invention, however, when the layer (b) surface is cold sealed or heat sealed to another film, if attempts are made to separate the seal, layer (b) separates, but the adhesive or sealant does not. Furthermore, the adherent film surfaces will not separate but will split in the skin layer (b) so that the adhesive itself remains sealed and covered by the remainder of the skin layer (b), and the adhesive is not exposed. Therefore, the seal cannot be readhered.

The film of the present invention comprises at least one cavitated layer, layer (b) which is applied to at least the lower face of core (a). The film may also comprise two or three cavitated layers, core layer (a), with layer (b) applied to the lower face of core (a) or to both the upper and lower faces of core (a). Core layer (a) may be the same or different than layer (b). If layer (b) is applied only to the lower face of core (a) and not to the upper face, then layer (c) may be applied to the upper face of core layer (a).

A tamper-evident package can be made using the film structure of the present invention with layer (b) inside the package, that is, layer (b) is the surface which is heat or cold sealed.

The polyolefins contemplated for the substrate or core layer material and the tamper-evident surface layer(s) of the subject film structure include polyethylene, polypropylene, polybutylene and copolymers and blends thereof. A crystalline polypropylene containing at least 80% by weight of isotactic polypropylene and having a melt flow index of from about 2 to 8 g/10 minutes is advantageously used for both the core layer and the skin layers. Also, titanium dioxide and particulates such as talc and syloid can be added to both the core and skin layers to impart brightness and antiblocking.

The polymer matrix material of core layer (a) can be a clear polypropylene or polyethylene or ethylene copolymerized with alpha olefins or blends thereof. The core layer can also be an opaque layer. The opacity of the opaque layer is achieved by introducing to this layer a stratum of voids which scatter light. The voids are created by mixing the matrix resin with an incompatible material followed by orientation. By incompatible it is meant that distinct phases of the two materials will result when an inter-blending of the two is attempted. Examples of such incompatible materials include polybutylene terephthalate and polyalphamethylstyrene. The incompatible material can be present in up to about 20% by weight of the matrix film. A preferred range is from about 2 to about 10 percent by weight.

A master batch technique can be employed either in the case of forming the spherical particles in situ or in adding preformed spheres to a molten thermoplastic matrix material. After the formation of a master batch, appropriate dilution of the system can be made by adding additional thermoplastic matrix material until the desired proportions are obtained.

Tamper-evident layer (b) which is to be applied to the lower face of core layer (a) and optionally also to the upper face of core layer (a), also has a polyolefin thermoplastic polymer matrix preferably of polypropylene and a filler which induces cavitation resulting in a stratum of voids located within the polymer matrix. Secondary skin layers may also be present adhering to the surface of layer (b), these secondary skin layers being of a thickness such that they do not substantially change the surface characteristics of skin layer (b).

The skin layer (b) thickness can be from about 2 to about 90% of the overall structure. It is preferred that the thickness of the skin layer (b) be from about 5 to about 20% of the overall structure.

The void-initiating particles dispersed as a filler phase into the polymeric matrix of layer (b) can be organic or inorganic, and are rigid particles which may or may not be identical in shape. The particles have a melting temperature higher than that of the polymeric matrix material. Some materials which may be used for the dispersed filler phase include calcium carbonate, zinc oxide, zeospheres, polyalphamethylstyrene (P$\alpha$MS), and polybutylene terethalate PBT). The void-initiating particles can be present in amounts from about 1 to about 20 weight percent of layer (b) prior to orientation, with about 10 to about 15 weight percent preferred. The void-initiating particles can be present in tamper-evident layer (b) in an amount which is below 10% by weight of the total film structure, preferably about 0.05% to about 4%.

It is preferred that the average diameter of the voidinitiating particles be from about 0.1 to about 10 microns. These particles initiate voids throughout the matrix material during biaxial orientation.

The void-initiating particle material must be incompatible with the skin material, at least at the temperature of biaxial orientation.

The tamper-evident skin layer (b) is described as being a thermoplastic polymer matrix material within which is located a stratum of voids initiated by irregularly shaped organic or inorganic particles. The term "stratum" is intended to convey the understanding that there are a great many voids within the matrix and the voids themselves are oriented so that the two major dimensions are aligned in correspondence with the direction of orientation of the polymeric film structure. After each void has been formed through the initiation of an inorganic or organic particle, the particle may contribute little else to the system. Pigments such as $TiO_2$ can be present or dispersed throughout the skin matrix. The pigment material is present in such a particle size and shape that it does not, at least in any material sense, contribute any void initiation by itself.

A typical void of the tamper-evident skin layer is defined as having major dimensions X and Y and minor dimension Z, where dimension X is aligned with machine direction orientation, dimension Y is aligned with transverse direction orientation and dimension Z approximately corresponds to the cross-sectional dimension of the inorganic/organic particle which initiated the void.

The orientation conditions are such that the X and Y dimensions of the voids of the tamper-evident skin layer (b) be major dimensions in comparison to the Z dimension. Thus while the Z dimension generally approximates the cross-sectional dimension of the inorganic/organic particle initiating the void, the X and Y dimensions must be significantly greater. In addition, the orientation conditions must be such that the general integrity of the voids is maintained. By this, it is meant that during the orientation which produces the X and Y dimensions, that is, either by simultaneous or sequential machine direction and transverse direction stretching, the temperature conditions must be such as to permit these major dimensions to form without any destruction of the voids in any of its dimensions. The voids are particularly vulnerable to destruction during sequential orientation if the stretching temperature is too low. Even in simultaneous orientation if the temperature is too low, the stretching forces will tend to cause internal shredding and void splitting. This leads to a complete loss of control over the integrity of the individual closed voids, and the consequent integrity of the matrix polymer. Thus, one skilled in the art, following the present general guidelines, can orient at a temperature and to a degree which will yield X and Y dimensions approaching a maximum without causing any substantial splitting, shredding or overall lack of void and matrix integrity.

Layer (c) which is optionally applied to the upper face of layer (a) may be fabricated from hydrocarbon copolymers, homopolymers and blends of homopolymers, and blends of copolymer(s) and homopolymer(s) heretofore employed for this purpose. For example, layer (c) may be polypropylene.

Layers (a), (b) and (c) may be coextruded.

The films may be biaxially oriented by conventional means. In general, this includes forming the film in sheet form and machine direction orienting (MDO) or stretching the same at the appropriate or optimum temperature, using transport rollers operating at different speeds. After the desired degree of MDO, the film is transverse direction oriented (TDO), for example in a tentering apparatus, to impart an orientation or stretching which is at right angles to the MDO. The extent 10 of orientation can be from about 3 to about 10 times its original dimension for the MDO and from about 3 to 10 times in the TDO.

The surface of the film may be treated to insure that an adhesive will be strongly adherent to the film. This treatment may be accomplished by employing known prior art techniques such as, for example, film chlorination, i.e., exposure of the film to gaseous chlorine, treatment with oxidizing agents such as chromic acid, hot air or steam treatment, flame treatment and the like. Although any of these techniques may be effectively employed to pretreat the film surface, a particularly desirable method of treatment has been found to be the so-called electronic treatment method which comprises exposing the film surface to a high voltage corona discharge while passing the film between a pair of spaced electrodes. After electronic treatment of the substrate film surface it may be coated with the adhesive by conventional techniques. Pretreatment of the surface is desirable in cold seal/coating applications. Optionally, a primer and a PVDC or acrylic type coating can be applied to the film surface prior to the application of the adhesive to achieve other desirable film properties.

A package fabricated from the film of the present invention may be sealed using a cold seal material such as Findley 211, 207 or with a heat seal.

The following examples illustrate the present invention.

In all examples, the tamper-evident films made according to the present invention were compared with standard packaging films as controls.

EXAMPLE 1

A mixture of isotactic polypropylene (94 parts, MP 160° C. and melt index of 3.0) and polybutylene terephthalate (PBT) (6 parts, MP 228° C.) was melted in an extruder provided with a screw of L/D ratio of approximately 20/1. A second extruder was in association with the first mentioned extruder and supplied with the same polypropylene but without the PBT present. A third extruder was also in association with these two mentioned extruders and was supplied with the same mentioned polypropylene and calcium carbonate (15 parts). A melt coextrusion was carried out while maintaining the cylinder of the core material ranging from 200° C. to 230° C. The polypropylene to be extruded by the second mentioned extruder as a skin layer (c) was maintained at a temperature of 230° C. The polypropylene and calcium carbonate blend to be extruded by the third mentioned extruder as skin layer (b) was also maintained at a temperature of 230° C. A film structure was coextruded with a core thickness of 70% of the total extruded thickness. The skin layers (b) and (c) were each 15% of the total extruded thickness. Calcium carbonate was present in an amount of 3% by weight of the total structure. The unoriented film measured approximately 38 mils in thickness. This sheet was subsequently oriented five and one half by eight times respectively in the machine and transverse direction. The machine direction, or MD, orientation temperature used was about 135° C. and the transverse, or TD, orientation temperature was about 155° C. This resulted in a 1.5 mil film with a density of about 0.60 gm/cc. A modified rubber based cohesive was then applied to the skin layer (b) at a thickness weight of about 3 lbs per ream to simulate an overwrap type package. In this case, the cohesive used was a commercially available Findley #211 cold seal. Two of the skin layers (b) which were coated with cohesive, were then sealed together using a standard packaging crimp sealer. All seals were produced at 80 PSI with a dwell time of ½ second. These seals were then separated using a Suter Tester at a pulling speed of 12" per minute in opposing directions. This film produced an unexpected complete delamination of the skin layer (b) from the core when the seal was pulled apart. This rendered the seal totally incapable of being rejoined together as there was no cohesive left exposed creating a tamper-evident type seal. The results are shown in Table 1.

TABLE 1

| FILM STRUCTURE | SEAL TYPE | SEAL STRENGTH (gms) | DESTRUCTION MODE | RESEALABILITY |
|---|---|---|---|---|
| TAMPER EVIDENT FILM: | | | | |
| Cavitated skin Core Polypropylene | Cold seal (F-211) | 140 | Delamination | No |
| CONTROL: | | | | |
| Polypropylene Core Poly- | Cold seal (F-211) | 160 | Cohesive Failure | Yes |

TABLE 1-continued

| FILM STRUCTURE | SEAL TYPE | SEAL STRENGTH (gms) | DESTRUCTION MODE | RESEALABILITY |
|---|---|---|---|---|
| propylene | | | | |

EXAMPLE 2

The process of Example 1 was repeated, except in this case, the cold seal designated was F-207 and this was applied to a polyvinylidene chloride (PVdC) coated version of Example 1. Similar physical properties resulted, as shown in Example 1, but the PVdC coating imparted, in this case, a lower WVTR with a higher seal strength along with the tamper-evident quality. The results are shown in Table 2.

TABLE 2

| FILM STRUCTURE | SEAL TYPE | MAX. SEAL STRENGTH (gms) | DESTRUCTION MODE | RESEALABILITY |
|---|---|---|---|---|
| PVdC COATED TAMPER EVIDENT FILM: | | | | |
| PVdC Cavitated skin Core Polypropylene | Cold seal (F-207) | 470 | Delamination | No |
| CONTROL: | | | | |
| PVdC Polypropylene Core Polypropylene | Cold seal (F-207) | 608 | Cohesive Failure | Yes |

EXAMPLE 3

The process of Example 2 was repeated, except in this case, the seal was a heat seal at 260° F. and 20 psi ¾ sec. This tamper-evident film again had a PVdC coating as discussed in Example 2, but for certain packaging applications, a heat seal is required. The results are shown in Table 3.

TABLE 3

| FILM STRUCTURE | SEAL TYPE | MAX. SEAL STRENGTH (gms) | DESTRUCTION MODE | RESEALABILITY |
|---|---|---|---|---|
| PVdC COATED TAMPER EVIDENT FILM: | | | | |
| PVdC Cavitated skin Core Polypropylene | 260° F. Heat Seal | 255 | Delamination | No |
| CONTROL: | | | | |
| PVdC Polypropylene Core Polypropylene | 260° F. Heat seal | 403 | Cohesive Failure | Yes |

EXAMPLE 4

The process of Example 1 was repeated, except in this case, the cold seal designated was F-207 and this was applied to an acrylic coated version of Example 1. Similar physical properties resulted, but the acrylic coating provided good machinability along with a high seal strength and tamper-evident quality. The results are shown in Table 4.

TABLE 4

| FILM STRUCTURE | SEAL TYPE | SEAL STRENGTH (gms) | DESTRUCTION MODE | RESEALABILITY |
|---|---|---|---|---|
| ACRYLIC COATED TAMPER EVIDENT FILM: | | | | |
| ACRYLIC Cavitated skin Core Polypropylene | Cold seal (F207) | 330 | Delamination | No |
| CONTROL: | | | | |
| ACRYLIC Polypropylene Core Polypropylene | Cold seal (F207) | 400 | Cohesive Failure | Yes |

EXAMPLE 5

The process of Example 4 was repeated except in this case, the seal was a heat seal. This tamper-evident film had an acrylic coating as discussed in Example 4, but for certain applications, a heat seal is required. The results are shown in Table 5.

TABLE 5

| FILM STRUCTURE | SEAL TYPE | SEAL STRENGTH (gms) | DESTRUCTION MODE | RESEALABILITY |
|---|---|---|---|---|
| ACRYLIC COATED TAMPER EVIDENT FILM: | | | | |
| ACRYLIC Cavitated skin Core Polypropylene | 260° F. Heat seal | 200 | Delamination | No |
| CONTROL: | | | | |
| ACRYLIC Polypropylene Core Polypropylene | 260° F. Heat seal | 260 | Cohesive Failure | Yes |

The data disclosed hereinabove reveal the unique properties of the tamper-evident film of the present invention. It should be noted that the destruction mode appears only when one attempts to tamper with the tamper-evident seal disclosed herein. The film remains intact, retaining its excellent packaging properties under normal handling conditions.

While there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

What is claimed is:

1. A tamper-evident film comprising:
   (a) an oriented polymer core layer having an upper face and a lower face;
   (b) an oriented tamper-evident layer applied to at least the lower face, but also optionally to the upper face of core layer (a), said layer (b) being fabricated from a mixture of a polyolefin and a filler which induces cavitation upon orientation, layer (b) having an internal cohesiveness which is less than the internal cohesiveness and bonding strength of packaging adhesives and heat seals; and
   (c) an oriented skin layer applied to the upper face of core layer (a) if layer (b) has not been applied thereon, said layer (c) being fabricated from a member of the group consisting of homopolymers, copolymers or blends thereof.

2. The film of claim 1 wherein said polymer of layer (a) is selected from the group consisting of polypropylene, polyethylene, ethylene copolymerized with alpha olefins and blends thereof.

3. The film of claim 1 wherein said layer (a) is fabricated from a polymer matrix material having a stratum of voids therein.

4. The film of claim 3 wherein said polymer matrix material of layer (a) is polypropylene.

5. The film of claim 3 wherein a substantial number of said voids within the polymer matrix material of layer (a) contains at least one void-initiating particle selected from the group consisting of polybutylene terephthalate and polyalphamethylstyrene, zinc oxide, zeospheres, and calcium carbonate.

6. The film of claim 1 wherein said polyolefin of layer (b) is selected from the group consisting of polyethylene, polypropylene, polybutylene, copolymers thereof, and blends thereof.

7. The film of claim 1 wherein said polyolefin of layer (b) is polypropylene.

8. The film of claim 1 wherein said filler of layer (b) is an organic material.

9. The film of claim 1 wherein said filler of layer (b) is an inorganic material.

10. The film of claim 1 wherein said filler of layer (b) is comprised of particles selected from the group consisting of calcium carbonate, zinc oxide, zeospheres, polybutylene terephthalate and polyalphamethyl styrene.

11. The film of claim 1 wherein said filler of layer (b) is present in amount from about 1 to about 20 weight percent.

12. The film of claim 1 wherein s id filler of layer (b) has a particle size of about 0.1 to about 10 microns.

13. The film of claim 1 wherein said filler of layer (b) is rigid particles which may or may not be identical in shape.

14. The film of claim 1 wherein the thickness of said layer (b) is from about 2% to about 90% of the film.

15. The film of claim 1 wherein the thickness of said layer (b) is from about 5% to about 20% of the film.

16. The film of claim 1 wherein said layer (c) is polypropylene.

17. The film of claim 1 wherein the layers are coextruded.

18. A tamper-evident package seal which comprises:
   (i) a first tamper-evident film as in claim 1 having an internal cohesive force and having an inner surface and an outer surface;
   (ii) a second film either identical to or different from the tamper-evident film as in claim 1; and
   (iii) at least one adhesive or heat sealant effective to bond said inner surface of first film (i) to said inner surface of the second film (ii),
said adhesive or heat sealant having both a seal internal cohesion and an affinity for bonded surfaces which are greater than said film internal cohesive forces, whereby a force applied to separate said films results in rupture of at least one of said films.

19. A tamper-evident package made using the tamper-evident seal of claim 18.

20. The tamper-evident package of claim 19 sealed with a heat seal.

21. The tamper-evident package of claim 20 sealed with a cold seal.

* * * * *